US012451015B2

(12) United States Patent
Reed et al.

(10) Patent No.: US 12,451,015 B2
(45) Date of Patent: Oct. 21, 2025

(54) DYNAMIC DIRECTION PROTOCOLS AND SYSTEM AMONG PARTIES IN TRAFFIC

(71) Applicants: Amanda Reed, Springfield, MO (US); Daniel E. Reed, Springfield, MO (US)

(72) Inventors: Amanda Reed, Springfield, MO (US); Daniel E. Reed, Springfield, MO (US)

(*) Notice: Subject to any disclaimer, the term of this patent is extended or adjusted under 35 U.S.C. 154(b) by 0 days.

(21) Appl. No.: 18/642,510

(22) Filed: Apr. 22, 2024

(65) Prior Publication Data

US 2024/0355207 A1 Oct. 24, 2024

Related U.S. Application Data

(60) Provisional application No. 63/497,247, filed on Apr. 20, 2023.

(51) Int. Cl.
*G08G 1/16* (2006.01)
*G08G 1/01* (2006.01)
*G08G 1/052* (2006.01)
*G08G 1/0967* (2006.01)

(52) U.S. Cl.
CPC ........... *G08G 1/166* (2013.01); *G08G 1/0116* (2013.01); *G08G 1/052* (2013.01); *G08G 1/096775* (2013.01)

(58) Field of Classification Search
CPC ...... G08G 1/166; G08G 1/0116; G08G 1/052; G08G 1/096775
See application file for complete search history.

(56) References Cited

U.S. PATENT DOCUMENTS

| | | | | |
|---|---|---|---|---|
| 9,424,749 | B1 * | 8/2016 | Reed | G08G 1/166 |
| 10,303,181 | B1 | 5/2019 | Wengreen | |
| 11,301,738 | B2 * | 4/2022 | Manci | G05D 1/0282 |
| 11,429,916 | B2 * | 8/2022 | Tsafaridis | B66C 5/02 |
| 11,756,427 | B1 * | 9/2023 | Reed | B66F 17/003 340/903 |
| 11,790,760 | B2 * | 10/2023 | Brown | H04W 4/70 340/539.16 |
| 11,975,710 | B2 * | 5/2024 | Linkowski | H04W 4/023 |
| 2012/0026890 | A1 * | 2/2012 | Banka | H04L 67/125 370/242 |
| 2012/0095646 | A1 * | 4/2012 | Ghazarian | G01S 19/17 340/905 |
| 2019/0184841 | A1 | 6/2019 | Van Wiemeersch | |
| 2019/0359058 | A1 | 11/2019 | Sato | |
| 2020/0072969 | A1 | 3/2020 | Zaidi | |

(Continued)

FOREIGN PATENT DOCUMENTS

WO 2022225226 A1 10/2022

OTHER PUBLICATIONS

International Search Report/Written Opinion issued in PCT/US2024/025719 on Apr. 22, 2024 (Apr. 22, 2024).

*Primary Examiner* — Peter D Nolan
*Assistant Examiner* — Wae L Louie
(74) *Attorney, Agent, or Firm* — Benjamin D. Rotman; UB Greensfelder LLP

(57) ABSTRACT

A predictive dynamic alert, control, and management system configured to detect traffic members through a plurality of sensor nodes and transponders in hazardous environments, learn and predict traffic paths and traffic habits of traffic members, and provide advance warning and advance action and control signals to prevent traffic accidents, is provided.

31 Claims, 3 Drawing Sheets

(56) References Cited

U.S. PATENT DOCUMENTS

| | | | | |
|---|---|---|---|---|
| 2020/0242924 | A1 | 7/2020 | Publicover | |
| 2020/0331465 | A1 | 10/2020 | Herman | |
| 2020/0339124 | A1* | 10/2020 | Vassilovski | H04W 4/46 |
| 2021/0272207 | A1 | 9/2021 | Fields | |
| 2022/0075052 | A1 | 3/2022 | Song | |
| 2022/0092984 | A1 | 3/2022 | Couperthwaite | |
| 2022/0219563 | A1* | 7/2022 | Lu | B60L 53/67 |
| 2022/0306092 | A1 | 9/2022 | Linkowski | |
| 2023/0091772 | A1 | 3/2023 | Frye | |
| 2024/0355207 | A1* | 10/2024 | Reed | G08G 1/096775 |
| 2024/0395142 | A1* | 11/2024 | Reed | G01S 13/62 |

* cited by examiner

DYNAMIC DIRECTION PROTOCOLS AND SYSTEM AMONG PARTIES IN TRAFFIC

CROSS-REFERENCE TO RELATED APPLICATIONS

This application claims the benefit of U.S. Provisional Application No. 63/497,247, filed Apr. 20, 2023. The foregoing patent disclosure is incorporated by this reference thereto.

BACKGROUND OF THE INVENTION

The invention generally relates to traffic among parties which may or may not include any of (1) pedestrians, (2) personnel-operated vehicles and machinery, (3) remotely controlled vehicles and machinery by remote personnel and (4) autonomously operating vehicles and machinery. Specifically, this invention relates to dynamically predicting, managing, and controlling traffic among traffic members in a hazardous environment.

Commercial warehouses, loading zones, work/construction zones, and other high traffic high risk areas are filled with traffic members including but not limited to pedestrians, personnel-operated vehicles and machinery, remotely controlled vehicles, machinery by remote personnel, and autonomously operating vehicles and machinery. Each traffic member in each particular traffic site constantly runs the risk of collision with other traffic members.

Commercial warehouses, for example, are commonly plagued with a problem known as 'blind" intersections, and sometimes also 'blind' corners. The root of this problem lies in the arrangement of the warehouse shelving. That is, the warehouse shelving is typically arranged in large high-rise rectangular blocks. These blocks are typically spaced by narrow aisles through which pedestrian and/or forklift trucks travel to and fro. There is an acute problem with intersections (and corners). The large high-rise rectangular blocks of shelving are sometimes so densely packed with boxes of product (or the like) that, there is no way for a pedestrian or forklift driver to see if there is any cross-flow traffic from the left or the right of the intersection until such pedestrian or forklift driver actually enters the intersection. Hence these are 'blind' intersections, and the potential for collision is ripe. A counterpart collision hazard is a 'blind' corner.

Another factor contributing to the confusion in these traffic lanes is the sheer noise in the warehouse or work zone. A cautious fork-lift driver might try to signal his or her approach to an intersection by horn or other audible siren. However, in large commercial warehouse with dozens upon dozens of forklifts (and other motor vehicle traffic) whizzing about, the atmosphere is deafened by the sounds of dozens of such sirens beeping at once. Workers in the warehouse tend to develop a complacency to the sirens. Also, the sound tends to echo and/or reverberate around in the warehouse such that, the source of any such beeping siren is simply indiscernible. So there is no good way to determine how near or far is the source of the siren. Accordingly, the cautious fork-lift driver who thought he or she was being cautious by signaling his or her approach to blind intersection with a siren, might as not even have bothered, as a practical matter.

Warning system signals using a plurality of sensors, transponders, and cameras as described in as described in U.S. Pat. No. 942,749 have attempted to create systems warning systems using light and display symbols to visually warn traffic members of additional hazards in the traffic system. These systems use transponders, sensors, and cameras to detect traffic members entering and moving about hazardous environments and provide an indicator light or visual signal to a respective traffic member indicating the type of traffic member that has entered the hazardous zone and in some cases have controls integrated into the traffic member to provide an automated response, such as stopping a vehicle, upon sensing a hazardous traffic condition.

While existing systems provide for immediate warning or action to respective traffic members, it may already be too late to take action to avoid the hazard.

The present invention attempts to remedy the shortcomings of the previous systems by providing a predictive dynamic alert, control, and management system.

SUMMARY OF THE INVENTION

In light of the foregoing a predictive dynamic alert, control, and management system configured to detect traffic members in hazardous environments, learn and predict traffic paths and traffic habits of traffic members, and provide advance warning and advance action to prevent traffic accidents, is provided.

It is an aspect of the invention to provide for a predictive and adaptable universal application of a signal and control system that would apply to detection, alerts, and/or control of traffic members in a hazardous environment. Traffic members may include but are not limited to pedestrians, drivers, operating equipment, machinery, vehicles, devices, and environmental infrastructure. Detection may be completed through a plurality of sensor nodes, imagers, and transponders coupled to both traffic members and communicatively coupled to each other or a backend server. Prediction may occur through collecting data from each sensor node, imager, and transponder, calculating relative motion of each traffic member, creating projected paths of motion and calculating a collision of projected paths among traffic members. Alerts conditions may be preprogrammed into any one of the sensor nodes or backend server and communicated throughout the system or only to traffic members relevant to a detected potential collision. Alerts may be visual, audible, or tactile and may be sent through the system to a sensor node or transponder coupled to a traffic member. Alert signals may be positionally directive to the predicted intersecting traffic member to facilitate traffic member operator (local, remote, or autonomous) rapid alert notification and initiation of an avoidance response (exp. Pause, stop, reverse, or redirect path or plane way). For example, light bars, audible signals, or visual representation on a monitor, may be activated in the direction of predicted intersecting traffic member to draw an operators attention to the direction of the potential collision. Control of a traffic member may be through integration of a sensor node into a traffic member wherein the sensor node may receive control instructions from the system and override the traffic member controls to avoid a collision. Controls may include but are not limited to stopping or pausing or modifying operational actions of traffic members such as adjusting direction, pathway, projection, angle, speed, plane, or other operations based on sensor detections within the defined space of the hazardous environment.

In one aspect of the predictive alert and control system, the system provides detection and notification of a condition wherein a moving single detectable device such as a transponder of a plurality of transponders and reader devices such as sensor nodes throughout the hazardous environment and further connect together to protect a traffic member by signaling the detection of a traffic or safety hazard (e.g., pedestrian, motor vehicle, operating or stationary hazard) and providing a signal warning of the hazard or operational control. A transponder is a mobile detectable device coupled to a traffic member (by way of an example the transponder device could be located in a badge worn by all persons allowed in the protected area) that emits a signal that when within the system programmed range of sensor nodes connected to the system, the certain receiving sensor nodes will activate the system to give notice to the pedestrians and motor vehicle operators that multiple personnel are detected within the shared traffic space sensor area so that they can avoid collision or other incident.

Given the foregoing, a localized network of wireless mobile detection devices, sensor nodes, or transponders are incorporated into apparatuses coupled to traffic members (e.g., an assigned badge in this example) in a protected area, are designed to activate a connected system of mobile traffic sensor nodes, coupled to the system for protected spaces or working areas such as encompassing blind intersections, corners of traffic way aisles, material handling equipment door openings, pedestrian crossings or entrance and exit ways, motor vehicle operation areas, heavy equipment operation or traffic areas, high hazard areas or others for both interior and exterior spaces as characterized and without limitation by what is found in commercial warehouses or industrial areas. The system may then gather data from the movement of the transponders within the localized network, send alert signals, to other traffic members in the network, and use the gathered data to create predictive models of traffic member behaviors and movement.

In one aspect a non-limiting system comprises a camera assisted wireless mobile warning light system; mobile detection devices, a plurality of transponders, and camera assisted sensor devise stationed or moving throughout a facility coupled together in a programmable mobile traffic system. In this aspect, the system includes a plurality of wireless vision smart devices in parallel with or in replacement of camera assisted wireless mobile warning light system.

In one aspect, a non-limiting system comprises one or more transponders and one or more sensor nodes coupled to one or more traffic members in a hazardous environment. Further, each transponder or sensor node may include programmable specific identity rights, permissions, controls, movement patterns or characteristics of traffic members including but not limited to, pedestrians, vehicle-drivers, vehicle-driven land vehicles, of remote-controlled land vehicles, machinery or equipment, of automated land vehicles, machinery or equipment of cameras, stationary traffic lights or signals, and/or of mobile traffic lights or signals. In some aspects, the system may monitor, control and direct based on system programmed priority of identities of traffic members.

In a yet another aspect, the system collects operating data, motion data, and other traffic member data through each sensing node or relative positional date through each transponder. In this aspect the system may use the sensor nodes to measure various real-world parameters to determine the presence and motion of other traffic members in the vicinity. One of skill in the art would recognize that common data collection sensors may include but are not limited to imagers, radar, lidar, proximity sensors, accelerometers, gyroscopes, thermometers, thermocouples, barometers, radio frequency or power signal strength detection sensors and antennae, and Bluetooth Low Energy (BLE)/Ultra Wideband (UWB)/Wi-Fi, or functionally equivalent wireless sensors transmitters, or receivers, or microphones to detect audio signals. The system may then perform sensor fusion by collating the collected and measured data from the multiple sensor nodes with different sensing technologies and transmit the collected and measured data to a system compute or prediction node. The prediction node further uses the collated data to maintain a registry of all nearby traffic members, track their relative motion, and predict whether a collision is imminent. Further, in addition to or separate from the backend server, the prediction node may form a distributed platform and continuously communicate with other prediction nodes in a peer-to-peer network, to ensure synchronization about the state of the environment around them. Further, the prediction nodes are configured to signal back to traffic members to be notify and alert of any imminent collisions and implement any automated controls. The use of sensor fusion by collecting sensor node data of different types from different traffic members will act allow the system to see around visual blind spots not sensed by cameras or operator line of sight.

In one aspect of the system, the sensor nodes and transponders are wirelessly coupled and share sensor detected information with the system to create one autonomous system monitoring all movement within designated space to provide for further optimization of traffic member operation. As described above, the system may be a centralized backed server-based system with each traffic member sensor node or transponder in communication with a backend server or configured as a peer-to-peer network with each traffic member sensor node or transponder in communication with each other. One of skill in the art would recognize that the system may be configured as a combination of both centralized server and peer-to-peer elements as well.

In one example, a non-limiting preferred system comprises: imagers and sensor node data, and transponder data, transmitted throughout an integrated mobile system, the sensor node data and imager data is transferrable to connected data storage devices to collate the data, to allow for incident recording and review, traffic flow analysis, security purposes and other uses; monitor, control and direct based on system programmed priority of identities; Monitoring or detection in all planes of sensor of movement or activity with detected data transmitted to or collected by the system to trigger designated alerts or actions or for data collection, analysis including traffic hazards, collisions, system operations or optimization.

The system may further include a user interface accessible via a mobile computing device configured to display collected sensor data, environmental maps showing active movement of traffic members and providing for user ability to preprogram traffic member identity information, traffic member movement patterns, and other pertinent traffic member or environmental data that can be used in conjunction with actual collected data to optimize predicted paths or remotely control integrated traffic members.

A non-limiting aspect of the system comprises wireless, remote charging and status check of all wireless devices including stationary or mobile sensor nodes, stationary or mobile anchor points, stationary or mobile data collection, storage or transfer devices, stationary or mobile system or data communication devices, stationary or mobile transponders, stationary or mobile signals, stationary or mobile cameras, stationary or mobile monitors or displays, stationary or mobile activation or deactivation devices, stationary or mobile system units or devices.

In one aspect, the system may comprise: at least one alarm condition that each mobile sensor node/transponder coupled to a traffic member is configured to monitor. Example alarm conditions may include any of—hazardous utilities or materials, hazardous piece of equipment on the ground plane, and mobile overhead hazards.

The dynamic direction protocols are preferably implemented over a host of computer and/or electronic controller operating systems as well as enabled by wireless communications including Ultra Wideband (UWB) short-range, wireless communication technologies.

It is to be recognized by one of skill in the art that the terms "software," "app," "module," "routine," or "sub-routine" may be used interchangeably in this specification to describe a software or component parts thereof. In some embodiments of the present invention, each described module or routine/sub-routine is a component part of a larger set of software instructions while in other embodiments each described module or routine/sub-routine act as independent software applications. It is also to be recognized by one of skill in the art that the term "database" as used may describe a single specific database, or a sub-section of a larger database.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION OF THE PREFERRED EMBODIMENTS

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

It is an aspect of the invention to provide for Detection of all entities or traffic members (identified and unidentified) within all planes of sensor range and calculation of the prediction of detected entities movement or actions (past, current or future) within area based on the entities, or combined entities, specific movement capabilities, specifications, patterns, operations, historical, or any other information.

Figure 1:
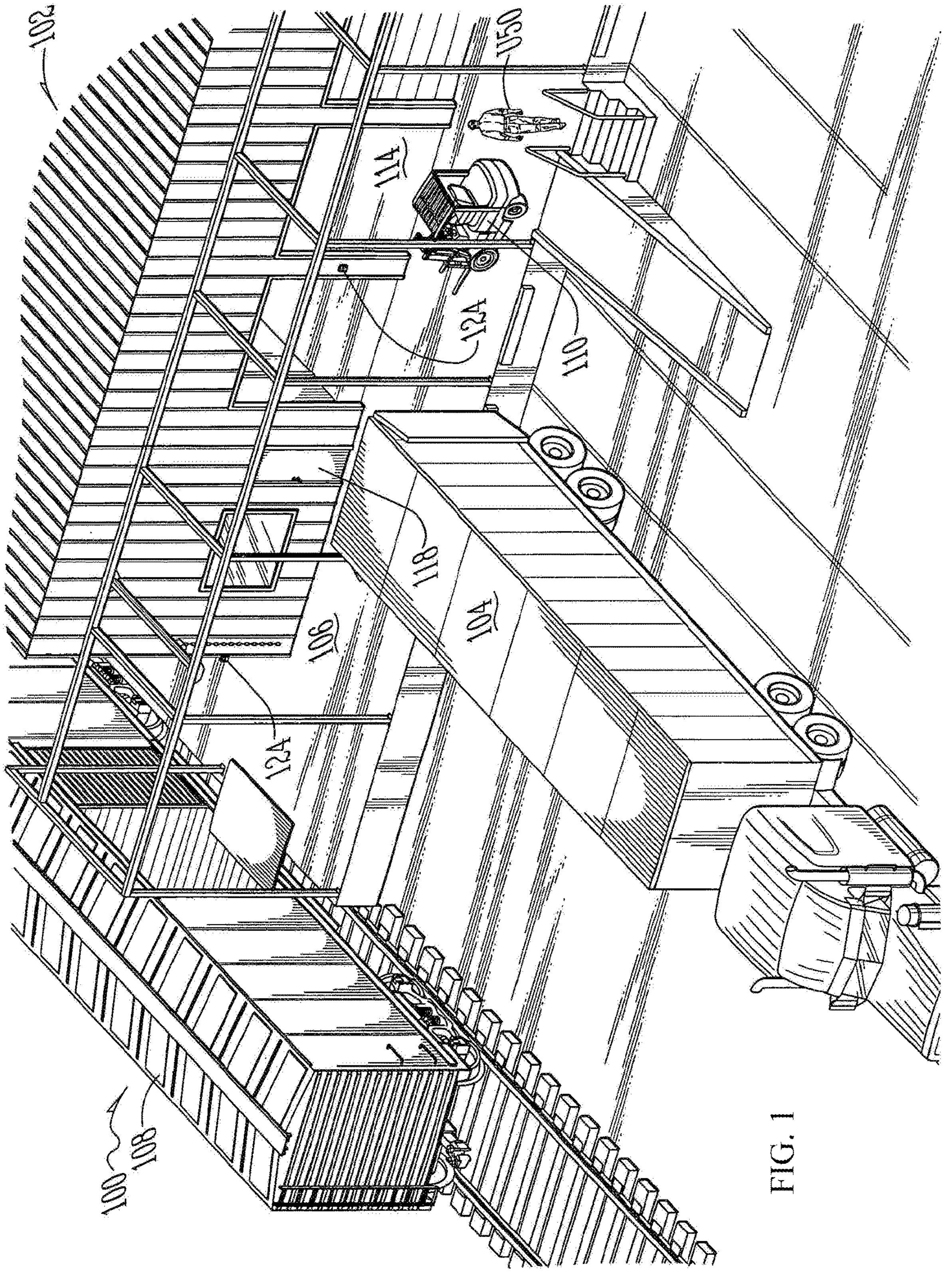
FIG. 1 is a perspective view of an example environment equipped with a system in accordance with the invention for congested trafficways.

FIG. 1 is a perspective view of an example environment for a traffic signal system 100 in accordance with the invention. It is designed to serve, in particular, in congested trafficways 102 for both indoor, outdoor, overhead (e.g., cranes, hoists) and underfoot (e.g., ledges) hazards which have both vehicular and pedestrian traffic members. A semi-trailer 104 is backed up to a loading dock 106. A train car 108 sits at a siding of the same loading dock 106. A forklift 110 is free to drive all over the loading dock 106 to lift out or set down freight with respect of either the trailer 104 or train car 108. The forklift 110 is also free to drive off the edge of the dock 106 if the driver is not careful (or warned by the system 100 in accordance with the invention, or shut off). A pedestrian U50 has walked up steps to alight on the loading dock 106, but in the blind spot of the driver of the forklift 110. A pedestrian U50 is shown having emerged onto the dock after walking up low steps. As an alternative, a vehicle or pedestrian could be emerging out of any of the roll-up (garage) doorways 114, from around a blind corner, from out of either the trailer 104 or train car 108, or in the case of pedestrians, emerging out of the swing door 118 from out of the office.

Figure 2:
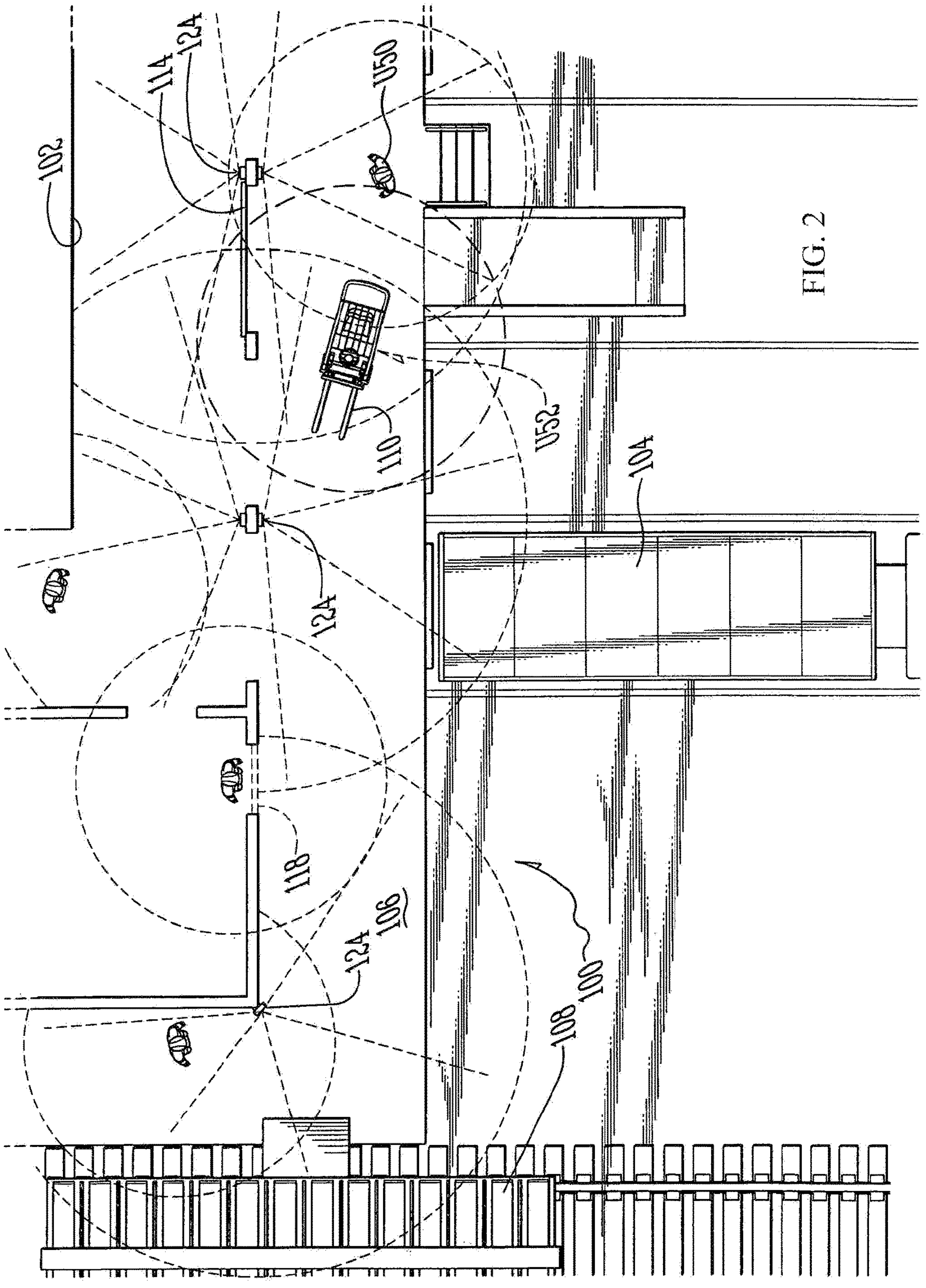
FIG. 2 is a plan view of FIG. 1 showing various objects to be detected and/or protected by the traffic signal system in accordance with the invention.

FIG. 2 is a plan view of FIG. 1. This FIG. 2 could actually be an electronic display served in real time to the forklift operator U52 in the forklift 110 in the center of the view. This view shows sensors 124 (which are combined with alarm lights 125, see, eg., FIG. 11) on corners and on posts of roll-up (garage) door openings 114. A pedestrian U50 is walking up the steps to the loading dock but behind the forklift 110, the driver U52 of which would be likely unaware of the pedestrian U50 if not for the system 100 in accordance with the invention.

A transponder or various sensor nodes may be coupled to each traffic member within the traffic environment to transmit movement and position data to the system. In some instances the transponders and sensor nodes coupled to each traffic member may be integrated into a single device.

Figure 3:
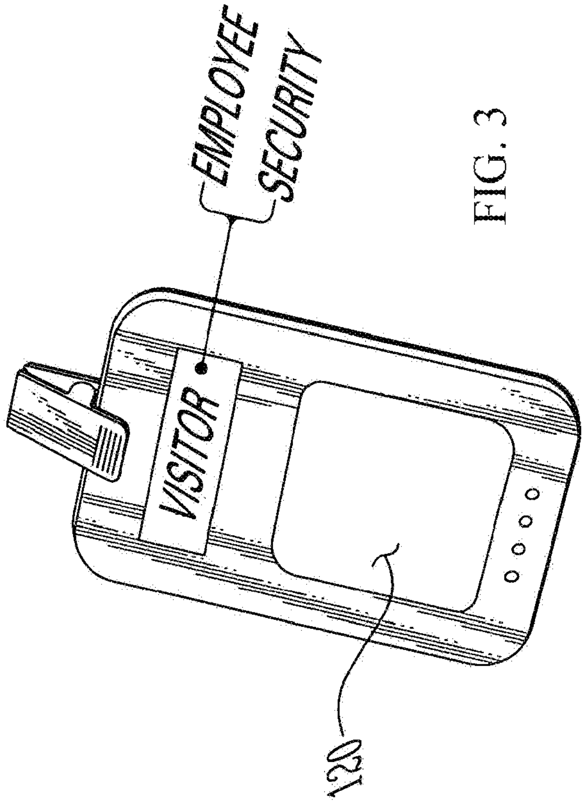
FIG. 3 is a perspective view of a transponder for use in the traffic signal system in accordance with the invention.

The transponder element comprises is a means for wireless communication and may comprise but is not limited to any common wireless RFID technology, cellular modem, NFC, Bluetooth, UWB or LORA radios, Wi-Fi, or other similar protocols. The transponder element may further comprise a battery and a means for wireless charging such as conductive charging, NFC charging, or over the air RF charging. FIG. 3 is a perspective view of a transponder 120 for use in the system 100 in accordance with the invention, comprising by way of non-limiting example an RFID tag (radio frequency identification tag).

Figure 4:
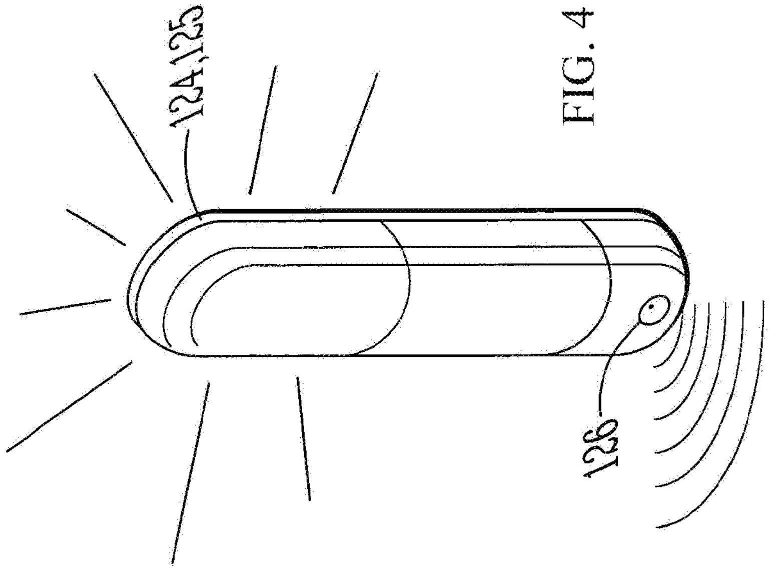
FIG. 4 is a perspective view of a combination alarm light and sensor node in accordance with the invention.

The sensor node or combined device may comprise a plurality of sensors including but are imagers, radar, lidar, proximity sensors, accelerometers, gyroscopes, thermometers, thermocouples, barometers, radio frequency or power signal strength detection sensors and antennae, BLE/UWB/Wi-Fi, or functionally equivalent wireless sensors transmitters, or receivers, or microphones to detect audio signals. The sensor node element may further comprise a battery, a means for wireless charging such as conductive charging, NFC charging, or over the air RF charging or RF harvesting. It should be recognized by one of skill in the art that each sensor node may be configured to collect multiple types of data and be configured for specific use for each traffic member. For example, a sensor node for a pedestrian may record movement data such as speed and path through use of the GPS or accelerometer and record environmental conditions through the camera, microphone, or heat sensing sensors. In another example, a sensor node coupled to a stationary traffic member or piece of infrastructure such as a post or beam may only include cameras or RF detecting modules to monitor transponders or provide visual tracking data to the system. The system is configured for sensor fusion by collecting data from a variety of sensor nodes to provide for optimal predictive movement models. FIG. 4 is a perspective view of a combination alarm light and sensor 124-125 in accordance with the invention, glowing or flashing light or making an audible warning. There moreover is an alarm siren 126 wherein the alarm options include both visual and aural alarms.

It is an aspect of the invention to provide a plurality of sensor locations and technologies as sensor nodes including: Stationary sensors installed within area, including areas beyond line of sight of local entity, that detect, collect, and transmit information on (movement of) entities or transponders to other entity transponders within specified range; Sensors on a plurality of other moving entities/transponders within area that detect, collect, and transmit sensor information to other entities or transponders, including entities/transponders beyond line of sight of local entity/transponder, within specified range; Sensor and transponder apparatus contained in strands or mesh or other woven material utilized to produce wearable detection and alert system; and/or Wearable detection and alert system that does not interfere with movement or operations of pedestrian or driver. Wearable detection and alert system include full functionality of detection and alert system including: plurality of sensors, transponder, system, battery, alert signaling.

The transponder, sensor node, or combined unit may further comprise memory to store to collected data locally and a processor or microcontroller to provide calculate such data and provide predictive assumptions and controls to the traffic member, or the transponder, sensor node, or combined unit may be communicatively coupled to a back end server configured to receive the collected data, process the collective data, and provide instructions or warnings to the respective traffic member. It should also be noted that the sensor node or transponder may be coupled to a gateway computing device coupled to each traffic member and that the gateway device may be configured to received signals from multiple sensor nodes and provide the predictive calculations. One of skill in the art would recognize that the sensor node, transponder, and gateway computing device may be separate devices or combined by various aspects of each into a single device. Sensor node in this application may refer to the node collecting data from the sensor, or the system combing sensor collection and the gateway computing device.

It is an aspect of the invention to utilize relative prediction information of any detected entities (identified and unidentified) within designated space to calculate prediction of movement or actions within area based on the entities, or combined entities, specific movement capabilities, specifications, patterns, operations, historical, or any other information to predict interaction of detected entities including intersecting pathways, collisions, near-miss collisions, operations, operational responses or other uses.

In this aspect the system uses each sensor node to dynamically collect movement data to measure preprogrammed aspects of traffic members, collate the data and send the data to either local or backend server compute nodes, prepare a predictive actions or track relative motion to predict imminent safety issues, synchronize with effected traffic member sensor nodes, and provide a control signal to traffic members that can be remotely controlled or an alert to traffic members that cannot.

In one example the first step in collision prediction is to capture sensor data. This includes the following sensors:

Proximity—each traffic member (forklifts and pedestrians) will track all objects that are in its proximity and use the signal strength from respective transponder or sensor nodes to determine if they should be tracked further. Each entity will maintain a 'Proximity List' that maintains the list of traffic members that are being tracked. The tracking may be conducted using:

Slow Two Way Ranging (TWR)—once an object is detected in the proximity range of an entity, it will start tracking the precise range of the object using a UWB-TWR at a relatively slow rate, in some cases this can be at 1 hz. Generally, TWR works by measuring the round trip time of a signal between a tag and an anchor, and then multiplying that time by the speed of light to calculate the distance between the two devices. In the case of forklifts for example, two sensor nodes will simultaneously range with the other traffic member to determine its relative bearing.

Fast TWR—a collate module of the system will use the Slow Ranging data to determine when an object can potentially be in the collision path. In case it determines that there is a risk, the other object will be added to a 'Danger List' and will switch to UWB-TWR at a relatively faster rate, for example, 10 Hz.

One Way Ranging (OWR)—the collate module will use the Slow Ranging data to determine if the traffic member has entered a Real Time Location Systems (RTLS) zone. If so, it will start UWB-OWR.

Accelerometer—each traffic member sensor node also collects 9-axis accelerometer data including gyroscope, magnetometer, and accelerometer.

After collection of tracking data as described above, each sensor node collates the data and either locally processes or sends such data to a backend server. In the example of the pedestrian and forklift, the system collate module may operate as follows:

- The collate layer runs on the forklift and the pedestrian and uses sensor fusion or a combination of the respective sensor nodes to model the current state of the traffic member.

Pedestrian Collation:

- Maintain Proximity List and Danger List
  - The lists can include the following entities:
    - Forklifts
    - Infrastructure markers
  - For each entity, maintain a history of the following:
    - Range
    - Ranging Mode (Slow-TWR, Fast-TWR or OWR)
- The collate module will also model its own current state.
  - Maintain a history of the 9-axis accelerometer readings.
  - Use sensor fusion to estimate the following:
    - Orientation
    - Step Rate/Step Strength
    - Activity State
      - Still
      - Stationary: Upright, Bending, Free-fall
      - Moving: Walking, Running, Driving
- The current state will be wirelessly communicated to the other traffic members.
- The pedestrian will determine if a forklift should be in the Danger List under the following conditions:
  - If the forklift communicates that the pedestrian is in their danger list If the forklift is headed towards them, and the range is less than a pre-programmed safety distance.

Forklift Collation:

Maintain Proximity List and Danger List

The lists can include the following entities:

Pedestrians

Other forklifts

Infrastructure markers

For each entity, maintain a history of the following:

Range: Left and Right independently; as well as collated

Ranging Mode (Slow-TWR, Fast-TWR or OWR)

Relative Position: Use collated range to determine the relative position and its uncertainty.

State of Motion

Speed

Direction

Uncertainty

The collate module will also model its own current state.

Maintain a history of the 9-axis accelerometer readings.

Use sensor fusion to estimate the following:

Orientation

Speed

Activity State

Still

Stationary: (Loaded or Unloaded?)

Moving: (Loaded or Unloaded?)

Environment State

Indoor/Outdoor

Ramp-Up/Ramp-Down/Horizontal

The current state will be communicated wirelessly to other traffic members.

The forklift will determine if a pedestrian should be in the Danger List under the following conditions:

If the pedestrian communicates that the forklift is in their danger list

If the range is falling and the distance is less than the preprogrammed distance If the range is preprogrammed distance, and the pedestrian is in the direction of motion of the forklift.

The forklift will determine if another forklift should be in the Danger List under the following conditions:

If the forklift communicates that the forklift is in their danger list

If the range is falling and the distance is greater than a preprogrammed distance If the range is greater than a preprogrammed distance and both forklifts are closing in If the range is less than a preprogrammed distance, and the forklift is in the direction of motion of the forklift.

After this data is collated from the sensor fusion, the system then uses a prediction module and models the future state of itself for each traffic member to determine if a collision is likely. In a first aspect, the system will analyze the relative positioning collected from the UWB sensor and accelerometer to determine if traffic members are getting closer, the speed at which they are getting closer, and compare that to historical travel paths to predict likelihood of future collision. For example, with these assumptions, the algorithm will model the future state of the forklift and the other entity to determine if their bubbles will overlap.

In case the forklift is moving forward or backward:

it checks whether the bubbles will overlap when the longitudinal position of the other traffic member, relative to the forklift, approaches zero.

In case the forklift is turning:

it checks whether the bubbles will overlap for a 180-degree rotation of the forklift's bubble, relative to its current orientation.

The system may utilize the information detected to predict intersection of pedestrians and/or vehicle-driver or remote driven vehicles or other hazards and signals (system defined) alerts when collisions are projected based on data detected on entity/transponders within area including travel pathway, speed of movement, angle of or direction, angle of projection, size or location of stationary objects or pathways barriers. If a collision is predicted, the system will send out an alert to the sensor nodes of the respective traffic members and if appropriate, issue a control order such as pause or stop. Once an alert is issued, the forklift, for example will continue to monitor the measurements for potential collision. The prediction module will maintain an 'Alert List' of all traffic members that are predicted in a collision path. Once it is determined that an entity on the Alert List is no longer in the collision path, the alert will be removed after a fixed delay. The system may activate system controlled and defined alerts or signals that may be differentiated by identity of entity or type of traffic member detected of for any combination of entity characteristics including: entity type (pedestrian, vehicle type, remote controlled or driver driven or other hazards); entity movement capabilities including speed, direction, turning radius, stopping distance (based on entity factory specifications and or historical data collected on entity or entity type); entity location; system defined requirements for entity or entity type for detected location of entity; entity or entity type authorization to area; detected direction or speed of movement of detected entity including moving forward, backward, turning, or stopping; entity or entity type rated load capacity; or entity actual load capacity.

It is an aspect of the invention to utilize relative calculated prediction information of any detected entities (identified and unidentified) within designated space to calculate prediction of movement or actions within area based on the entities, or combined entities, specific movement capabilities, specifications, patterns, operations, historical, or any other information to predict or control the interaction of detected entities including intersecting pathways, collisions, near-miss collisions, entity operations, operational responses, operational changes, operational status, malfunctions, signaling, alerts, data recording, data transfer or other uses.

It is an aspect of the invention to utilize data from interconnected sensors, or other system devices, including sensors within line of sight of detected entities, sensors not within line of sight of detected entities, or sensor data collected by mobile or stationary sensors within designated area, to calculate the prediction of any movement or actions based on the detected entities, or combined entities, specific movement capabilities, specifications, patterns, operations, historical, or any other information to predict, monitor or control the actions, interactions or operations of detected entities, other system entities, or operations.

It is an aspect of the invention to provide for sensor fusion of multiple technologies or detection methods to provide dynamic calculation of current or future actions, movement, and operation or intersection prediction. In this aspect, the system will measure data from multiple sensor nodes comprising multiple sensor inputs. By way of example, a stationary traffic member sensor node coupled to and corresponding to an overhead beam may comprise an imager that records image and video data in its line of site. The video may be analyzed in the collate and prediction modules to recognize stationary and moving traffic members and develop a history of movement speeds and travel patterns to create a model of predicted future travel paths. In the same system and same environment an out of site traffic member may comprise UWB-proximity sensing that detects a traffic member moving closer and shares that measured proximity data through the collate module to the prediction module. The prediction module may then compare proximity data and historic path data to determine the likelihood of a collision. In the case where the data is from both sensors is frequently seen together and the paths never collide, the system may predict a collision is not imminent, however, in the case where the system has not learned or the data paths from both sensors in combination are likely to collide, the system can issue an alert or a control action to the respective traffic members through the sensor nodes.

In another example, in interior spaces, UWB equipped sensor nodes capture surface reflections of respective traffic members and filter (through derivative calculation) through the "noise" of all the capture reflections and other types of sensor information to detect nearby movement. The use of UWB equipped sensor allows for signal detection around in non-line of site situations as signals bounce around stationary barricades and are either reflected back the to transmitting sensor node or received by a sensor node on a receiving module. Further, a method to avoid non line of sight collisions wherein a first sensor node of a plurality of sensor nodes comprises a UWB transmitter and receiver and is coupled to a gateway computing device of a first traffic member of a plurality of traffic members, comprising the steps of: the first sensor node transmitting a UWB signal; the UWB signal reflecting off of the plurality of traffic barriers and out of sight traffic members back to the first sensor node; the first sensor node transmitting the reflected UWB signal to the gateway computing device of the first traffic member; the gateway computing device of the first traffic member analyzing the reflected UWB signal and mapping out proximity of traffic barriers and out of sight traffic members based on time to receive the reflected UWB signal; the gateway computing device of the first traffic member adding traffic members to a proximity list based on proximity of each traffic member within a predefined proximity threshold; and the gateway computing device of the first traffic member transmitting the first traffic member projected path to the gateway computing devices coupled to the traffic members on the proximity list. One of skill in the art would recognize that these steps may be completed with multiple equipped sensor nodes on multiple traffic members allowing the gateway computing devices (or gateway computing devices as coupled to a backend server) to create a an even more detailed proximity list and map of traffic members.

It is an aspect of the invention to provide a system that utilizes information detected to predict intersection of pedestrians and/or vehicle-driver or remote operated vehicles or other hazards, and signals (system defined) alerts when collisions are projected based on identification of intersecting entities and the system information regarding the entities detected including automated or robotic operated hazards;

Such System information by entity including:

Pedestrian or moving vehicle; Pedestrian's authorized area;

Vehicle-driver driver-safety record and experience;

Vehicle-driver authorization to operate vehicle or equipment;

Pedestrian or Vehicle type authorized in area by location or designated times;

Vehicle specified size and rated load capacity; and/or

Vehicle information calibrated to actual load size and load projection beyond vehicle specified size.

It is an aspect of the invention that the System detects Vehicle-driver identity being paired with equipment and will limit equipment operation to system designated Vehicle-drivers authorized to operate the specific equipment or equipment type.

It is an aspect of the invention to provide for System controlled equipment operation based on qualifications of detected driver paired with equipment-including Pedestrians training, driver safety records and experience.

It is an aspect of the invention that the System includes in the prediction calculation and alert signal responses based on the identified Vehicle-Drivers safety record, driving experience rating and recorded movement patterns.

It is an aspect of the invention that the Traffic system that utilizes information on detected identities to identify, track, record operation or location or movement and signal system controllable alerts or information to pedestrians, or vehicle drivers, or monitoring personnel based on detected identity.

It is an aspect of the invention to provide for Sensor fusion of multiple technologies and multiple sensors, either on vehicle or within detection range of vehicle, to calculate the actual load size, load projection or load constrains, including movement or transfer of load, carried by Vehicle.

In one aspect of the invention each traffic is assigned a badge/transponder or sensor node with information applicable to the specific traffic member including but not limited to any combination of the following:

System information by entity including:

Entity type (Pedestrian, driver driven vehicle, remote driven vehicle, overhead hazard, other hazards);

Entity authorized area;

Entity authorization to operate vehicle or equipment types;

System controlled pairing of authorized driver to authorized equipment; Entity safety record and experience;

Entity vehicle authorized in area;

Entity vehicle factory specified capabilities including movement, size and rated load capacity;

Entity Vehicle actual capability based on historical information calibrated to actual load size and projection beyond vehicle specified size;

Entity Vehicle current information calibrated to actual load size and load projection beyond vehicle specified size; and/or Specifications or limits within area.

It is an aspect of the invention to provide for System detection of any combination of conditions including:

If badge/transponder/sensor node was dropped;

If badge/transponder/sensor node has low battery;

If badge/transponder/sensor node is not responding to system;

If badge/transponder/sensor node needs software update; and/or

If badge/transponder/sensor node is stationary beyond system defined time allowances;

If badge/transponder/sensor node has not passed through system checkpoints or has not uploaded system data on badge/transponder/sensor node activity within system defined guidelines.

It is an aspect of the invention to provide for location of the badge/transponder/sensor node within an area:

If badge/transponder/sensor node was in authorized or assigned area; and/or

If badge/transponder/sensor node was "paired" in movement to authorized or unauthorized driver driven vehicle.

It is an aspect of the invention to provide for system detected badge/transponder that sends system defined alerts to assigned entity or monitoring personnel and collects all detection data collected for assigned entity badge/transponder (e.g., as Based on detection conditions listed above).

It is an aspect of the invention to provide for Cameras activated and sensor information collected at point of prediction and deactivated when prediction has passed.

It is an aspect of the invention to provide a System that utilizes signal alerts of intersection or collision to activate cameras and sensors within range of predicted intersection for data collection.

It is an aspect of the invention to provide for cameras activated and sensor information collected at point of prediction and remain activated until system authorized personnel deactivate.

It is an aspect of the invention to provide for data collection to include all sensor data for entities/transponders predicted to intersect or within system defined range of predicted intersection.

It is an aspect of the invention to provide for A system utilizing sensors or cameras for detection, recognition, classification, categorization, and/or identification of stationary or moving objects comprising: Detection of system entity/transponders; and/or detection of non-system entity/transponders, moving objects with recognition of identity markers for categorization of detected objects movement capabilities or other system controlled responses.

It is an aspect of the invention to provide for detection of non-moving objects with recognition of identity markers for classification of barrier type, size, or system response including calculation of system entity/transponders predicted intersection.

It is an aspect of the invention to have system interconnected data collection or health check points stationed within designated area to collect data and operational status, including battery life, of mobile sensors and transponders as they move within designated area, with all data and operational information transmitted to full system for storage, action, or analysis.

It is an aspect of the invention to provide for Wireless data and health check information collected from stationary or mobile devices that are not directly connected to system using devices installed on powered land vehicles that will collect the information from the wireless, unconnected units and transmit the data and health check information collected to system interconnected data collection points as they travel within the protected space.

It is an aspect of the invention to provide for Wireless recharging of battery powered, stationary or mobile devices from regenerative power transmitters installed on power sourced land vehicles or other operational units, that, as the power sourced units moves throughout the protected space, transmits power to rechargeable power receptors installed on battery powered system devices to recharge the battery powered devices.

Those of ordinary skill in the art will understand and appreciate the aforementioned description of the invention has been made with reference to certain exemplary embodiments of the invention, which describe dynamic direction protocols, system, and method of use. Those of skill in the art will understand that obvious variations in construction, material, dimensions or properties may be made without departing from the scope of the invention which is intended to be limited only by the claims appended hereto.

The invention claimed is:

1. A predictive traffic alert and control system for traffic ways comprising:

a plurality of sensor nodes configured to collect movement data through at least one sensor of the plurality of sensor nodes monitoring movement, speed, position, direction, or orientation of at least one traffic member of a plurality of traffic members;

the at least one sensor node of the plurality of sensor nodes communicatively coupled to a gateway computing device or server and configured to transfer the movement data to the gateway computing device or server;

the gateway computing device or server configured to store and analyze the movement data of the at least one traffic member of the plurality of traffic members and create a projected future path of movement of the at least one traffic member based on a dynamic and ongoing collection of movement data and history of prior collected or preprogramed movement data for the each traffic member of the plurality of traffic members;

the gateway computing device or server configured to compare the projected future path of the at least one traffic member with a projected future path of at least a second traffic member of the plurality of traffic members to determine if the projected future path of the at least one traffic member will intersect with the projected future path of the at least a second traffic member;

the gateway computing device or server configured further configured to communicate an alert signal or a control signal to the at least one traffic member or at least second traffic member to alert the at least one traffic member or at least second traffic member or to control the at least one traffic member to avoid a potential collision;

wherein a first sensor node of the plurality of sensor nodes is coupled to a gateway computing device of a first traffic member of the plurality of traffic members and a second sensor node of the plurality of sensor nodes is coupled to a gateway computing device of a second traffic member of the plurality of traffic members;

each the first traffic member and second traffic member having a preprogrammed identity correlating to each traffic member and the gateway computing device of the first traffic member or gateway computing device of a second traffic member are further configured to transmit the preprogrammed identity to each traffic member; and wherein at least one of the first traffic member or second traffic member is in motion and either and the gateway computing device of the first traffic member or and the gateway computing device of the second traffic member is configured to detect the transmitted preprogrammed identity and add preprogrammed identity to a stored proximity list while in a preprogrammed transmit or receive range;

wherein the at least one traffic member projected future path intersects with a second traffic member projected future path and the server or gateway computing device sends an alert signal or control signal to the first traffic member or second traffic member;

wherein each the first sensor node and the second sensor node additionally comprise an Ultra Wide Band (UWB) transmitter and receiver, and the first sensor node and second sensor node collect movement data of the first traffic member and the second traffic member through slow two-way ranging at a low frequency and transmit the movement data of the first traffic member and second traffic member to the server or gateway computing device; and wherein the first traffic member and second traffic member reach a threshold proximity distance between the first and second traffic members and the server or each gateway computing device adds the first traffic member and second traffic member to a danger list and commands the a gateway computing device of a first traffic member and the gateway computing device of a second traffic member to conduct fast two-way ranging through the sensor nodes at a high frequency to collect movement data at a faster rate.

2. The predictive traffic alert and control system of claim 1 wherein the at least one traffic member comprises at least one of a pedestrian, machine, vehicle, driver, or stationary element.

3. The predictive traffic alert and control system of claim 1 further comprising positionally directive alert signals directed to the at least one traffic member or at least second traffic member having intersecting projected future paths.

4. The predictive traffic alert and control system of claim 1 wherein the gateway computing device comprises a processor and memory, is integrated into a control system of the at least one traffic member or at least second traffic, and is configured to receive and send the at least one traffic member or at least second traffic operational control commands or alert signals.

5. The predictive traffic alert and control system of claim 1 wherein the gateway computing device is communicatively coupled to the server and is configured to receive control commands or alert signals from the server.

6. The predictive traffic alert and control system of claim 1 wherein the server or gateway computing device is further configured create the projected future path of movement of the at least one traffic member based on preprogrammed movement capabilities of the at least one traffic member, preprogrammed traffic patterns of the at least one traffic member, or previous recorded driver history or safety records.

7. The predictive traffic alert and control system of claim 1 wherein at least on one traffic member of the plurality of traffic members is coupled to a gateway computing device, wherein the gateway computing device comprises a processor and memory, and further wherein the gateway computing device is configured to receive and send the at least one traffic member operational control commands or alert signals and further wherein the gateway computing device or server transmits an alert signal or control signal only to the gateway computing devices of traffic members projected to intersect.

8. The predictive traffic alert and control system of claim 1 wherein at least on one traffic member of the plurality of traffic members is coupled to a gateway computing device, wherein the gateway computing device comprises a processor and memory, and further wherein the gateway computing device is configured to receive and send the at least one traffic member operational control commands or alert signals and further wherein the gateway computing device or server transmits an alert signal or control signal to traffic members that are no longer projected to collide.

9. The predictive traffic alert and control system of claim 1 wherein the plurality of sensor nodes comprises at least one the following sensors: imager, radar, lidar, proximity sensor, accelerometer, gyroscope, thermometer, thermocouple, barometer, radio frequency or power signal strength detection sensors and antennae, and Bluetooth Low Energy (BLE)/Ultra Wideband (UWB)/Wi-Fi transmitters, or receivers, or a microphone.

10. The predictive traffic alert and control system of claim 9 where the plurality of sensor nodes includes at least a first sensor node and a second sensor node collecting data from at least one of the following sensors: imager, radar, lidar, proximity sensor, accelerometer, gyroscope, thermometer, thermocouple, barometer, radio frequency or power signal strength detection sensors and antennae, and BLE/UWB/Wi-Fi transmitters, or receivers, or a microphone; and wherein the first sensor node and second sensor node collect data form different sensors.

11. The predictive traffic alert and control system of claim 10 wherein the first sensor node, the second sensor node, or the first traffic member or the second traffic member comprise an Radio Frequency Identification (RFID) transponder having the preprogramed identity correlating to the traffic member and have an transponder RFID receiver.

12. The predictive traffic alert and control system of claim 10 wherein the first sensor node and second sensor node transmit first traffic member movement data and second traffic member movement data collected through an accelerometer of the first sensor node and second sensor node.

13. The predictive traffic alert and control system of claim 1 wherein the slow two-way ranging is conducted at about 1 hz and the fast two-way ranging is conducted at about 10 hz.

14. A method to avoid non line of sight collisions using the predictive traffic alert and control system of claim 9 wherein a first sensor node of the plurality of sensor nodes comprises a UWB transmitter and receiver and is coupled to a gateway computing device of a first traffic member of the plurality of traffic members, comprising the steps of:

the first sensor node transmitting a UWB signal;

the UWB signal reflecting off of a plurality of traffic barriers and out of sight traffic members back to the first sensor node;

the first sensor node transmitting the reflected UWB signal to the gateway computing device of the first traffic member;

the gateway computing device of the first traffic member analyzing the reflected UWB signal and mapping out proximity of traffic barriers and out of sight traffic members based on time to receive the reflected UWB signal;

the gateway computing device of the first traffic member adding traffic members to a proximity list based on proximity of each traffic member within a predefined proximity threshold; and the gateway computing device of the first traffic member transmitting the first traffic member projected path to the gateway computing devices coupled to the traffic members on the proximity list.

15. The predictive traffic alert and control system of claim 1 wherein the plurality of sensor nodes transmit sensor node health and power data to the server or a gateway computing device.

16. The predictive traffic alert and control system of claim 15 wherein a sensor node of the plurality of sensor nodes transmits a low power signal to the server or gateway computing device and the server or gateway computing device sends a control signal to the sensor node to recharge at a charging station.

17. The predictive traffic alert and control system of claim 16 wherein the sensor node comprises a means for conductive charging, wireless or near field communications charging or radio frequency receiver configured to harvest power radio frequencies, and the charging station is configured to accommodate conductive charging, wireless or near field communications charging or transmits power radio frequencies to be harvested.

18. A predictive traffic alert and control system for traffic ways comprising:

a plurality of sensor nodes configured to collect movement data through at least one sensor of the plurality of sensor nodes monitoring movement, speed, position, direction, or orientation of a plurality of traffic members;

the plurality of sensor nodes each configured to store and analyze the movement data of any traffic member of the plurality of traffic members and create a projected future path of movement of any traffic member of the plurality of traffic members based on a dynamic and ongoing collection of movement data and history of prior collected or preprogramed movement data for any traffic member of the plurality of traffic members;

at least one sensor node of the plurality of sensor nodes configured to compare the projected future path of the at least one traffic member of the plurality of traffic members with a projected future path of at least a second traffic member of the plurality of traffic members to determine if the projected future path of the at least one traffic member will intersect with the projected future path of the at least a second traffic member; and the at least one sensor node further configured to communicate an alert signal or a control signal to the at least one traffic member or at least second traffic member to alert the at least one traffic member or at least second traffic member or to control the at least one traffic member to avoid a potential collision;

wherein a first sensor node of the plurality of sensor nodes is coupled to a first traffic member of the plurality of traffic members and a second sensor node of the plurality of sensor nodes is coupled to a second traffic member of the plurality of traffic members;

each the first sensor node or second sensor node or each the first traffic member or second traffic member having a preprogrammed identity correlating to each traffic member and each the first sensor node or second sensor node or each the first traffic member or second traffic member are further configured to transmit the programmed identity to the first sensor node or second sensor node or each the first traffic member or second traffic member;

wherein at least one of the first traffic member or second traffic member is in motion and either the first sensor node or second sensor node or the first traffic member or second traffic member is configured to detect the first sensor node or second sensor node or the first traffic member or second traffic member and add the each traffic member to a stored proximity list while in a preprogrammed transmit or receive range;

wherein the first sensor node and second sensor node transmit first traffic member movement data and second traffic member movement data of the first sensor node and second sensor node to each other and calculate a first traffic member projected future path and a second traffic member projected future path;

wherein the first traffic member projected future path intersects with the second traffic member projected future path and the first sensor node or second sensor node transmits an alert signal or control signal to the first traffic member or second traffic member;

wherein each the first sensor node and the second sensor node additionally comprise an Ultra Wide Band (UWB) transmitter and receiver, and the first sensor node and second sensor node collect movement data of the first traffic member and the second traffic member through slow two way ranging at a low frequency and transmit the movement data of the first traffic member and second traffic member to each other or a server; and wherein the first traffic member and second traffic member reach a threshold proximity and the first sensor node and second sensor node add the first traffic member and second traffic member to a danger list and command the first sensor node and second sensor node to conduct fast two way ranging at a high frequency to collect movement data at a faster rate.

19. The predictive traffic alert and control system of claim 18 wherein the at least one traffic member comprises at least one of a pedestrian, machine, vehicle, driver, or stationary element.

20. The predictive traffic alert and control system of claim 18 wherein the at least one traffic member is a machine or vehicle and the sensor node is integrated into the machine or vehicle control system and is configured to send the machine or vehicle operational control commands.

21. The predictive traffic alert and control system of claim 18 wherein at least one sensor node of the plurality of sensor nodes is further configured create the projected future path of movement of the at least one traffic member based on preprogrammed movement capabilities of the at least one traffic member, preprogrammed traffic patterns of the at least one traffic member, or previous recorded driver history or safety records.

22. The predictive traffic alert and control system of claim 18 wherein the plurality of sensor nodes are communicatively together or communicatively coupled to a backend server or communicatively coupled to the plurality of traffic members.

23. The predictive traffic alert and control system of claim 22 wherein an alert signal or controls signal is only transmitted to traffic members of the plurality of traffic members having an intersecting projected future path.

24. The predictive traffic alert and control system of claim 23 wherein a stop alert signal or stop control signal is only transmitted to traffic members of the plurality of traffic members no longer having an intersecting projected future path.

25. The predictive traffic alert and control system of claim 24 wherein the plurality of sensor nodes comprises at least one the following sensors: imager, radar, lidar, proximity sensor, accelerometer, gyroscope, thermometer, thermocouple, barometer, radio frequency or power signal strength detection sensors and antennae, and Bluetooth Low Energy (BLE)/Ultra Wideband (UWB)/Wi-Fi transmitters, or receivers, or a microphone.

26. The predictive traffic alert and control system of claim 25 wherein the plurality of sensor nodes includes at least a first sensor node and a second sensor node collecting data from at least one of the following sensors: imager, radar, lidar, proximity sensor, accelerometer, gyroscope, thermometer, thermocouple, barometer, radio frequency or power signal strength detection sensors and antennae, and BLE/UWB/Wi-Fi transmitters, or receivers, or a microphone; and wherein the first sensor node and second sensor node collect data form different sensors.

27. The predictive traffic alert and control system of claim 18 wherein the first sensor node, the second sensor node, or the first traffic member or the second traffic member comprise an Radio Frequency Identification (RFID) transponder having the preprogramed identity correlating to the traffic member and have an transponder RFID receiver.

28. The predictive traffic alert and control system of claim 18 wherein the slow two way ranging is conducted at about 1 hz and the fast two way ranging is conducted at about 10 hz.

29. The predictive traffic alert and control system of claim 28 wherein the plurality of sensor nodes transmit sensor node health and power data to the server or a separate sensor node.

30. The predictive traffic alert and control system of claim 29 wherein the a sensor node of the plurality of sensor nodes transmits a low power signal to the server or a separate sensor node and the server or a separate sensor node sends a control signal to the sensor node to recharge at a charging station.

31. The predictive traffic alert and control system of claim 30 wherein the sensor node comprises a means for conductive charging, wireless or near field communications charging or radio frequency receiver configured to harvest power radio frequencies, and the charging station is configured to accommodate conductive charging, wireless or near field communications charging or transmits power radio frequencies to be harvested.

* * * * *